United States Patent
Park et al.

(10) Patent No.: US 10,271,044 B2
(45) Date of Patent: Apr. 23, 2019

(54) METHOD AND SYSTEM FOR CHECKING VIDEO CALL QUALITY OF MOBILE TERMINAL

(71) Applicant: NAVER BUSINESS PLATFORM CORPORATION, Seongnam-si (KR)

(72) Inventors: Sun Young Park, Seongnam-si (KR); Dongwon Lee, Seongnam-si (KR); YoungSik Kim, Seongnam-si (KR)

(73) Assignee: NAVER Business Platform Corp., Seongnam-si (KR)

( * ) Notice: Subject to any disclaimer, the term of this patent is extended or adjusted under 35 U.S.C. 154(b) by 0 days.

(21) Appl. No.: 16/053,316

(22) Filed: Aug. 2, 2018

(65) Prior Publication Data

US 2019/0045179 A1 Feb. 7, 2019

(30) Foreign Application Priority Data

Aug. 2, 2017 (KR) .......................... 10-2017-0098168

(51) Int. Cl.
| | |
|---|---|
| *H04N 17/00* | (2006.01) |
| *H04N 7/01* | (2006.01) |
| *H04N 7/14* | (2006.01) |
| *H04N 5/04* | (2006.01) |
| *G06K 9/00* | (2006.01) |

(52) U.S. Cl.
CPC .............. *H04N 17/00* (2013.01); *H04N 5/04* (2013.01); *H04N 7/0127* (2013.01); *H04N 7/141* (2013.01); *G06K 9/00711* (2013.01); *G06K 2209/01* (2013.01)

(58) Field of Classification Search
CPC ...... H04N 17/00; H04N 17/004; H04N 17/08; H04N 7/147; H04N 7/141
USPC ............................................. 348/14.01–14.16
See application file for complete search history.

(56) References Cited

U.S. PATENT DOCUMENTS 9,467,688 B2 * 10/2016 Karimi-Cherkandi ......................
H04N 17/004
2005/0243910 A1 * 11/2005 Lee ....................... H04N 17/004
375/240.01

FOREIGN PATENT DOCUMENTS

| EP | 1995978 A1 * | 11/2008 | .......... H04N 17/004 |
|---|---|---|---|
| JP | 2007267144 A | 10/2007 | |
| JP | 2016192658 A | 11/2016 | |
| KR | 1020090042487 A | 4/2009 | |

* cited by examiner

*Primary Examiner* — Melur Ramakrishnaiah
(74) *Attorney, Agent, or Firm* — Greer Burns & Crain Ltd.

(57) ABSTRACT

Disclosed is a method of measuring a video call quality of a mobile terminal, the method including establishing a video call between a transmitting terminal and a receiving terminal; modifying a video capture function provided from a terminal operating system (OS) and inserting a sequentially increasing index and timestamp into each video frame that is automatically acquired through a camera every time a video call application (app) of the transmitting terminal calls the video capture function; transmitting, by the transmitting terminal, the video frame to the receiving terminal; storing, by the receiving terminal, the video frame at a ratio higher than a frame per second (FPS) of the transmitting terminal; and extracting the index and the timestamp from the stored video frame through an optical character reader (OCR) text recognition and calculating a quality index.

9 Claims, 5 Drawing Sheets

| Quality index name | Details |
|---|---|
| Number of video frames | Number of video frames transmitted from transmitting terminal to receiving terminal $$N_{frame} = Idx[n] - Idx[0] + 1$$ |
| Initial delay | Time used to transmit initial video frame from transmitting terminal to receiving terminal $$D_{int} = TS\_R[0] - TS\_S[0]$$ |
| Average delay | Average transmission delay value of video frames transmitted from transmitting terminal to receiving terminal $$D_{avg} = \frac{\sum(TS\_R[j] - TS\_S[j])}{N_{frame}}$$ |
| Jitter | Deviation width of video frame transmission delay values $$Jitter = \sqrt{\frac{\sum(TS\_R[j] - TS\_S[j])^2}{N_{frame} - 1}}$$ |
| FPS | $$FPS = \frac{Idx[n] - Idx[0]}{TS\_S[n] - TS\_S[0]} \times 1000$$ |
| Skipped ratio | Ratio of skipped video frames not transmitted in video frame $$R_{skip} = \frac{Count(Uniq(Idx[j]))}{Idx[n] - Idx[0] + 1} \times 100$$ |
| Freezing count Freezing Duration | $$IS\_FREEZ[j] = (TS\_R[j] - TS[j-1]) \geq \frac{\sum Idx[j-1]}{Idx[j-1] - Idx[j-2] + 1}$$ |

FIG. 5

METHOD AND SYSTEM FOR CHECKING VIDEO CALL QUALITY OF MOBILE TERMINAL

CROSS-REFERENCE TO RELATED APPLICATION(S)

This application claims priority under 35 U.S.C. § 119 to Korean Patent Application No. 10-2017-0098168 filed on Aug. 2, 2017, in the Korean Intellectual Property Office (KIPO), the entire contents of which are incorporated herein by reference.

BACKGROUND OF THE INVENTION

Field of Invention

One or more example embodiments of the present invention relate to a video call quality measurement method and system, and more particularly, to a method and system for measuring an actual video call quality between two mobile terminals each in which a video call application (app) is installed.

Description of Related Art

With the popularization and high performance of smartphones and also with the speed-up of mobile communication networks, such as long-term evolution (LTE), the use of mobile video calls using smartphones are also on the rapid increase. Also, in addition to a basic video call service provided from a communication provider, various mobile video call applications (apps) supporting video calls, such as Skype, LINE, etc., have been competing in the mobile video call market.

Various mobile video call services have emerged and the use thereof has been increasing. Accordingly, it is more important to measure and manage quality of experience (QoE) indicating quality experienced by an actual user in a video call.

As a standard specification for video service quality measurement through networks, Perceptual Evaluation of Video Quality (PEVQ) has been developed by an international standardization organization, International Telecommunication Union (ITU), and evolves. Basically, the PEVQ standard is configured to transmit a predetermined source video, to receive a video, and to compare and measure the received video with the source video. The PEVQ standard may be applied for quality measurement of various video streaming services and various video application services such as video conferencing. However, there are some difficulties in applying the PEVQ standard to video call quality measurement of a mobile terminal. The PEVQ may simply compare a video with a prestored reference video source and thus, may not perform a measurement on an actual video call through a camera of a mobile terminal.

Also, in the case of the PEVQ standard, a length of a reference video for testing is limited to be 6 to 20 seconds. Accordingly, a measurement may not be performed on a video call and a video service of 20 seconds or more.

BRIEF SUMMARY OF THE INVENTION

One or more example embodiments provide a method and system that enables a terminal with a video call application (app) configured to execute a video call to measure a video call quality, that is, quality of experience (QoE) experienced by a user.

One or more example embodiments also provide a method and system that simply and accurately measure a QoE of a user since the user is allowed to use a video terminal of the user as is without applying a particular modification and an actual video call path of a mobile communication network is used as is.

According to an aspect of one embodiment, there is provided a method of measuring a video call quality of a mobile terminal, the method including establishing a video call between a transmitting terminal and a receiving terminal; modifying a video capture function provided from a terminal operating system (OS) and inserting a sequentially increasing index and timestamp into each video frame that is automatically acquired through a camera every time a video call application (app) of the transmitting terminal calls the video capture function; transmitting, by the transmitting terminal, the video frame to the receiving terminal; storing, by the receiving terminal, the video frame at a ratio higher than a frame per second (FPS) of the transmitting terminal; and extracting the index and the timestamp from the stored video frame through an optical character reader (OCR) text recognition and calculating a quality index.

The video call quality measurement method may further include initiating a video call measurement in a terminal agent installed in each of the transmitting terminal and the receiving terminal; and performing time synchronization between the transmitting terminal and the receiving terminal, prior to establishing the video call between the transmitting terminal and the receiving terminal.

The video call quality measurement method may further include reading, by the receiving terminal, a video frame buffer at a ratio higher than the FPS of the transmitting terminal and storing the video frame buffer as a received video frame; and reading, by an OCR text recognizer of the receiving terminal, a timestamp value and an index value in each video frame and generating a list of index values and a list of timestamp values, after establishing the video call.

The calculating may include calculating the quality index based on at least one of a number of transmission frames that is a number of video frames transmitted from the transmitting terminal to the receiving terminal, an initial delay that is a time used to transmit an initial video frame from the transmitting terminal to the receiving terminal, an average delay that is an average transmission delay value of video frames transmitted from the transmitting terminal to the receiving terminal, a jitter that is a deviation width of video frame transmission delay values, a skip ratio that is a ratio of skipped video frames not transmitted from the transmitting terminal to the receiving terminal, and a freezing indicating that a screen is frozen on the receiving terminal.

According to an aspect of one embodiment, there is provided a video call quality measurement system including a mobile terminal with a video call app configured to execute a function of measuring a video call quality of the mobile terminal, the video call quality measurement system including a terminal agent. Here, the terminal agent includes a video capture function configured to insert a sequentially increasing index and timestamp into a video frame every time a video capture function provided from a terminal OS and used to acquire the video frame through a camera is called in response to a video call connection in a transmitting terminal; a frame buffer acquirer configured to read the video frame at a ratio higher than an FPS of the transmitting terminal in a receiving terminal; an OCR text recognizer configured to recognize the index and the timestamp in the video frame; and a quality index calculator configured to calculate a quality index of the video frame based on values of the recognized index and timestamp.

The terminal agent may further include a time synchronizer configured to synchronize a time through a network time protocol (NTP) server for time synchronization between the transmitting terminal and the receiving terminal.

The quality index calculator may be configured to calculate the quality index based on at least one of a number of transmission frames that is a number of video frames transmitted from the transmitting terminal to the receiving terminal, an initial delay that is a time used to transmit an initial video frame from the transmitting terminal to the receiving terminal, an average delay that is an average transmission delay value of video frames transmitted from the transmitting terminal to the receiving terminal, a jitter that is a deviation width of video frame transmission delay values, a skip ratio that is a ratio of skipped video frames not transmitted from the transmitting terminal to the receiving terminal, and a freezing indicating that a screen is frozen on the receiving terminal.

According to an aspect of one embodiment, there is provided a video call quality measurement system including a mobile terminal with a video call app configured to execute a function of measuring a video call quality of the mobile terminal, the video call quality measurement system including a terminal agent. The terminal agent includes a modified video capture function configured to insert a sequentially increasing index and timestamp into a video frame every time a video capture function provided from a terminal OS and used to acquire the video frame through a camera is called in response to a video call connection in a transmitting terminal; a frame buffer acquirer configured to read the video frame at a ratio higher than an FPS of the transmitting terminal in a receiving terminal; and a quality index calculator configured to calculate a quality index of the video frame based on an index value and timestamp value recognized in the video frame.

The terminal agent may further include a time synchronizer configured to synchronize a time through an NTP server for time synchronization between the transmitting terminal and the receiving terminal.

The quality index calculator may be configured to calculate the quality index based on at least one of a number of transmission frames that is a number of video frames transmitted from the transmitting terminal to the receiving terminal, an initial delay that is a time used to transmit an initial video frame from the transmitting terminal to the receiving terminal, an average delay that is an average transmission delay value of video frames transmitted from the transmitting terminal to the receiving terminal, a jitter that is a deviation width of video frame transmission delay values, a skip ratio that is a ratio of skipped video frames not transmitted from the transmitting terminal to the receiving terminal, and a freezing indicating that a screen is frozen on the receiving terminal.

According to an aspect of one embodiment, there is provided a video call quality measurement method of a transmitting terminal, the method including establishing a video call with a receiving terminal; inserting a sequentially increasing index and timestamp into a video frame every time a video capture function provided from a terminal OS and used to acquire the video frame through a camera is called in response to a video call connection; and transmitting the video frame into which the index and the timestamp are inserted to the receiving terminal at a preset FPS. The receiving terminal reads the video frame at a ratio higher than the FPS and calculates a quality index of the video frame based on an index value and a timestamp value recognized in the video frame.

The video call quality measurement method may further include synchronizing a time through an NTP server for time synchronization with the receiving terminal.

The quality index may be calculated based on at least one of a number of transmission frames that is a number of video frames transmitted from the transmitting terminal to the receiving terminal, an initial delay that is a time used to transmit an initial video frame from the transmitting terminal to the receiving terminal, an average delay that is an average transmission delay value of video frames transmitted from the transmitting terminal to the receiving terminal, a jitter that is a deviation width of video frame transmission delay values, a skip ratio that is a ratio of skipped video frames not transmitted from the transmitting terminal to the receiving terminal, and a freezing indicating that a screen is frozen on the receiving terminal.

According to an aspect of one embodiment, there is provided a video call quality measurement method of a receiving terminal, the method including establishing a video call with a transmitting terminal; receiving a video frame in which a sequentially increasing index and timestamp are inserted from the transmitting terminal at a preset FPS; reading the video frame at a ratio higher than the FPS; recognizing the index and the timestamp in the video frame; and calculating a quality index of the video frame based on values of the recognized index and timestamp. Every time a video capture function provided from a terminal OS and used to acquire the video frame through a camera is called in response to a video call connection in the transmitting terminal, the sequentially increasing index and the timestamp are inserted into the video frame.

The video call quality measurement method may further include synchronizing a time through an NTP server for time synchronization with the transmitting terminal.

The calculating may include calculating the quality index based on at least one of a number of transmission frames that is a number of video frames transmitted from the transmitting terminal to the receiving terminal, an initial delay that is a time used to transmit an initial video frame from the transmitting terminal to the receiving terminal, an average delay that is an average transmission delay value of video frames transmitted from the transmitting terminal to the receiving terminal, a jitter that is a deviation width of video frame transmission delay values, a skip ratio that is a ratio of skipped video frames not transmitted from the transmitting terminal to the receiving terminal, and a freezing indicating that a screen is frozen on the receiving terminal.

According to example embodiments, a method and system for measuring a video call quality of a mobile terminal may measure an actual video call quality between two mobile terminals each in which a video call app is installed.

Also, according to some example embodiments, without comparing a reference video source and a call video, it is possible to read a specific index and timestamp inserted into a transmitted video frame through an OCR text recognition and to calculate a quality index of the video frame based on such information.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION OF THE INVENTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

Currently, in addition to basic video call applications (apps) provided from mobile communication companies, various types of video call apps have emerged and an annual use rate on mobile video call services is on the increase.

Accordingly, there is a continuously increasing request for measuring the quality of a mobile video call actually experienced by a user. However, Perceptual Evaluation of Video Quality (PEVQ) that is a conventional international standardization may compare a video with a reference video source and thus, may not measure an actual video call through a camera of a mobile terminal.

Also, the PEVQ standard corresponds to significantly heavy specification and thus, its reference may be implemented in a high-specification terminal such as a personal computer (PC), however, it may not be directly implemented in a mobile terminal.

To outperform the above issues, herein disclosed is a configuration that may insert a sequentially increasing index and timestamp into a video frame through a camera of a mobile terminal of a transmitting end (hereinafter, also referred to as a transmitting terminal) and enables a mobile terminal of a receiving end (hereinafter, also referred to as a receiving terminal) to receive the video frame and store the video frame at a ratio higher than a frame per second (FPS) of the transmitting terminal, to extract the index and the timestamp from the stored video frame, to measure at least one of a delay, a jitter, and a freezing for the index and the time stamp extracted through an optical character reader (OCR) text recognition, and to calculate a quality index of the video frame.

Hereinafter, a video call quality measurement system according to at least one example embodiment will be described with reference to FIG. 1.

Figure 1:
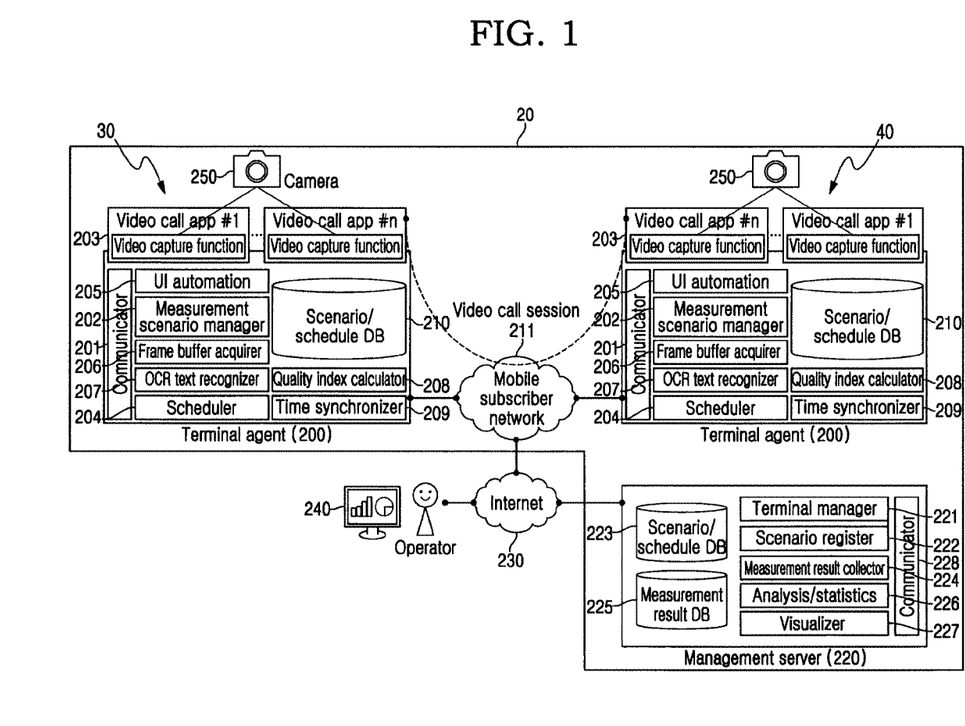
FIG. 1 is a block diagram illustrating a video call quality measurement system according to one embodiment.
Figure 2:
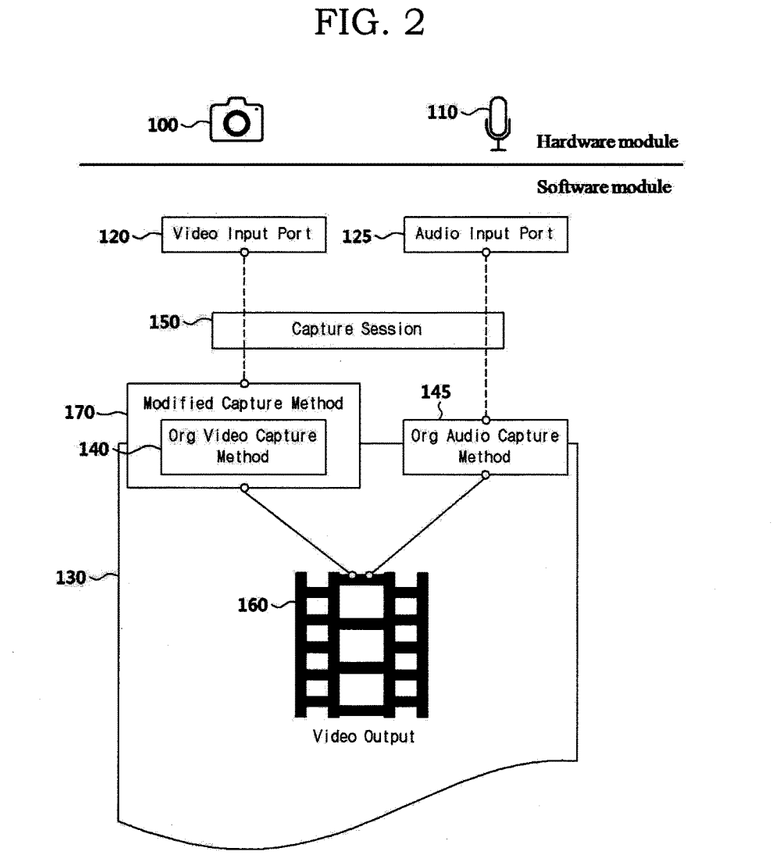
FIG. 2 illustrates a configuration of a video call app installed in a mobile terminal according to one embodiment.

FIG. 1 is a block diagram illustrating a video call quality measurement system according to one embodiment, and FIG. 2 illustrates a configuration of a video call app installed in a mobile terminal according to one embodiment.

Referring to FIG. 1, a video call quality measurement system 20 may include a terminal agent 200 of a transmitting terminal 30, a terminal agent 200 of a receiving terminal 40, and a management server 220. The terminal agents 200 have identical configurations and may be connected to each other over a mobile subscriber network 211. The terminal agents 200 and the management server 220 may be connected over the Internet 230.

Referring to FIG. 2, a mobile terminal 50 for a video call may include a camera 100 and a microphone 110 as hardware modules, and may also include a video call app 130 configured to enable an actual video call by executing the camera 100 and the microphone 110. The video call app 130 calls an original (Org) video capture function 140 and an original audio capture function 145 provided from a terminal operating system (OS) to connect a video input port 120 and an audio input port 125 to the camera 100 and the microphone 110 and to read the video and the audio. The video call app 130 receives an input of the video and the audio through a capture session 150 configured to connect the original video capture function 140 and the video input port 120 and the original audio capture function 145 and the audio input port 125, stores the received video and audio in an internal video storage unit 160, and transmits the same to a receiving terminal.

The original video capture function 140 called by the video call app 130 performs the functionality of inserting a sequentially increasing or changing index and timestamp into a video frame every time the original video capture function 140 is called by the video call app 130. Therefore, a modified video capture function 170 is provided to modify the original video capture function 140 provided from an existing terminal OS so that the index and the timestamp may be automatically inserted every time the video call app 130 reads a video. Here, a rooted terminal state may be used. In general, in Android and iPhone systems, an operation of a user may operate by user right. The rooted terminal may open OS security so that the operation of the user may operate by root (super user) right. Once the function of the modified video capture function 170 is installed, the security feature of the mobile terminal 50 may be reset through factory resetting.

Referring again to FIG. 1, the video call quality measurement system 20 may include the terminal agent 200, a video call app 203 used for an actual video call among video call apps installed to the mobile terminal 50, a camera 250 of the mobile terminal 50 executed by the video call app 203, the mobile subscriber network 211 to which the transmitting terminal 30 and the receiving terminal 40 connect for communication, and the management server 220 configured to manage the terminal agents 200, to collect a result of measuring a video call quality, and to visually provide the result to an operator 240 through the Internet 230. The above components may be provided to each of the transmitting terminal 30 and the receiving terminal 40.

Further describing a configuration, of the terminal agent 200 in either the transmitting terminal 30 or the receiving terminal 40, the terminal agent 200 may include a communicator 201 configured to provide a communication interface with the management server 220, a measurement scenario manager 202 configured to receive and manage a measurement scenario and a schedule from the management server 220, and a scenario/schedule database (DB) 210 configured to store the measurement scenario and the schedule, a scheduler 204 configured to operate the measurement scenario based on the schedule, a user interface (UI) automation 205 configured to automatically execute the measurement scenario on a terminal user interface to be same as the actual user in a test environment for measuring the video call quality, a frame buffer acquirer 206 configured to read a video frame buffer of the terminal at a high ratio, an OCR text recognizer 207 configured to recognize and read an index value and a timestamp value in a frame image read from the video frame buffer, a quality index calculator 208 configured to calculate a quality index based on the read index value and timestamp value, and a time synchronizer 209 configured to perform time synchronization between the transmitting terminal and the receiving terminal.

The management server 220 may include a terminal manager 221 configured to register and manage a plurality of terminals, a scenario register 222 configured to register a measurement video call app and a use scenario of the user, a scenario/schedule DB 223 configured to store the measurement scenario and the schedule, a measurement result collector 224 configured to collect a measurement result, a measurement result DB 225 configured to store the measurement result, and analysis/statistics unit 226 configured to perform an analysis/statistics on the measurement result, a visualizer 227 configured to visualize an analytic/statistical result and provide the same to the operator 240, and a communicator 228 configured to communicate with the terminal agent 200.

Hereinafter, an operation for measuring a video call quality between mobile terminals will be further described.

A function of synchronizing an accurate time of an ms unit is required so that the transmitting terminal 30 may insert a sequentially increasing timestamp and index into a video frame at preset intervals and the receiving terminal 40 may extract the timestamp and index from the video frame and may analyze the extracted timestamp and index. For this purpose, the time synchronizer 209 may synchronize a time through a network time protocol (NTP) in response to starting each measurement for the video call quality between mobile terminals. The scheduler 204 may execute a specific video call app 203 and automatically attempt a call connection to the receiving terminal 40. Once the call is connected, the video call app 203 of the transmission terminal 30 may capture a video from the camera 250 through the original video capture function 140. Not the original video capture function 140 provided from the terminal OS, but the modified video capture function 170 automatically inserts an index and a timestamp into a video frame and the video call app 203 of the transmission terminal 30 may transmit the video frame into, which the index and the timestamp are inserted to the receiving terminal 40.

When the UI automation 205 of the receiving terminal 40 receives a call of a specific video call app 203 while waiting for the same, the receiving terminal 40 may connect the call through automatic response thereto. Once the call is connected, the frame buffer acquirer 206 of the receiving terminal 40 may access the video frame buffer of the receiving terminal 40 at a high ratio and may store the video frame buffer in a video storage as a video through the OCR text recognizer 207. The OCR text recognizer 207 may extract the index value and the timestamp value from the video image of the video frame buffer using an image recognition technique and the quality index calculator 208 may calculate various video quality indices based on the extracted index value and timestamp value and may transmit the calculated video quality indices to the management server 220 through the communicator 201.

That is, a quality index of a video frame may be calculated by inserting a sequentially increasing index and timestamp into the video frame through a camera of the transmitting terminal 30, and by storing, by the receiving terminal 40, the video frame at a ratio higher than an FPS of the transmitting terminal, extracting the index and the timestamp from the stored video frame, and measuring at least one of a delay, a jitter, and a freezing for the index and the timestamp extracted through an OCR text recognition.

Figure 3:
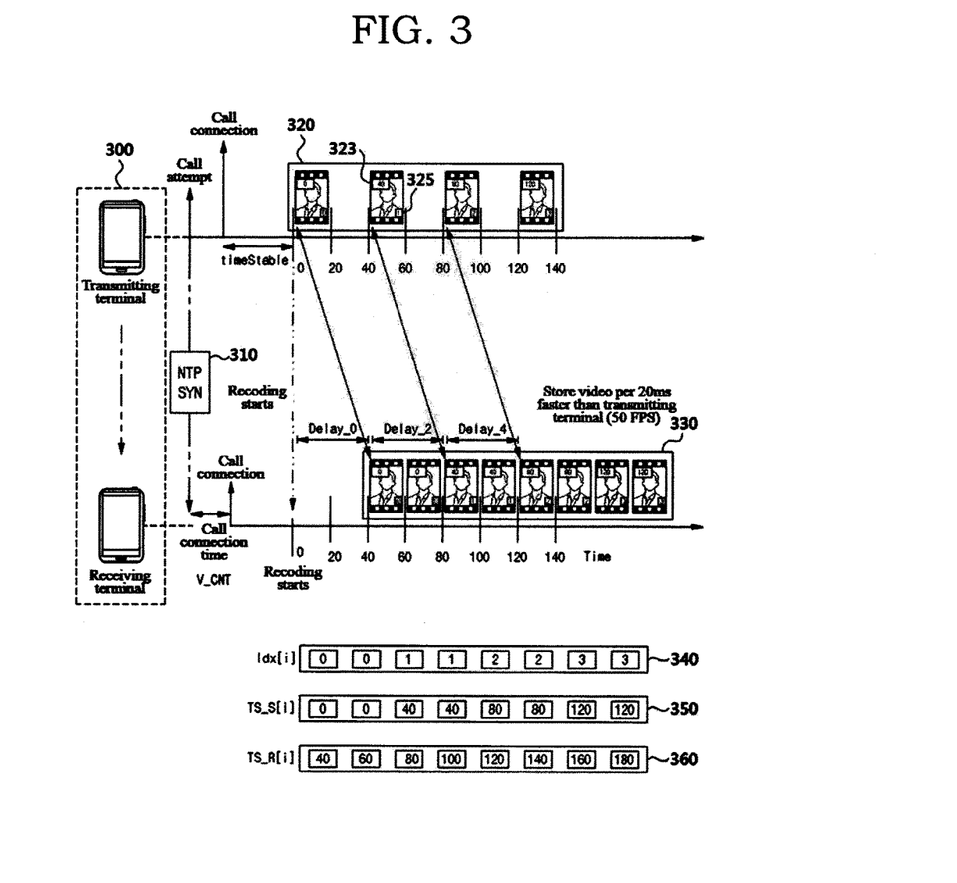
FIG. 3 illustrates an example of a method of calculating a video call quality in a video call between a transmitting terminal and a receiving terminal according to one embodiment.

FIG. 3 illustrates an example of a method of calculating a video call quality in a video call between the transmitting terminal 30 and the receiving terminal 40 according to one example embodiment.

Referring to FIG. 3, if the terminal agent 200 installed in each of the transmitting terminal 30 and the receiving terminal 40 included in a box 300 indicated with dotted lines initiates a video call measurement, a time synchronization may be performed between the transmitting terminal 30 and the receiving terminal 40 in operation 310. Once the call is connected, the video call app 203 of the transmitting terminal 30 requests a video through the camera 250 at predetermined (or, alternatively, desired) intervals. The modified video capture function 170 of FIG. 2 may insert a timestamp 323 and an index 325 into a video frame 320 and the video call app 203 of the transmitting terminal 30 may transmit the video frame 320 into which the timestamp 323 and the index 325 are inserted to the receiving terminal 40.

Once the call is connected, the frame buffer acquirer 206 of the terminal agent 200 installed in the receiving terminal 40 may read a video frame buffer of the terminal at a high ratio, which is described above with reference to FIG. 1.

General video call apps perform a transmission at 18 frames per second or less, however, the terminal agent 200 of the receiving terminal may read the video frame buffer at a ratio higher than an FPS used by video call apps, for example, at 50 frames per second or more and may store the read video frame buffer as a received video frame 330 to perform a highly accurate time measurement.

Here, the OCR text recognizer 207 of the terminal agent 200 of the receiving terminal 40 may read a timestamp value and an index value in each video frame 320 and may generate Idx[i] 340 corresponding to a list of index values, TS_S[i] 350 corresponding to a list of timestamp values, and TS_S[i] 360 corresponding to a list of timestamp values of the receiving side.

The equality index calculator 208 of the terminal agent 200 may calculate the quality index based on the lists of index values and timestamp values and may transmit the calculated quality index to the management server 220.

Figure 4:
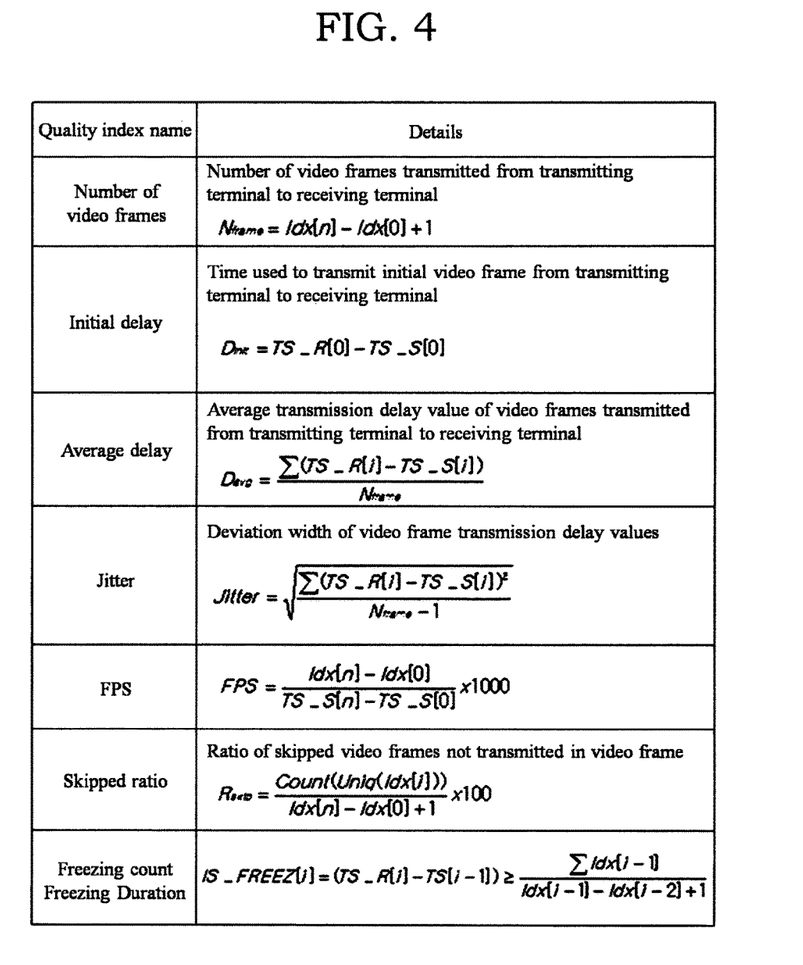
FIG. 4 is a table showing equations for calculating parameters used to calculate a video quality index according to one embodiment.

Parameters used to calculate the video quality index may include at least one of a number of transmission frames that is a number of video frames transmitted from the transmitting terminal 30 to the receiving terminal 40, an initial delay that is a time used to transmit an initial video frame from the transmitting terminal to the receiving terminal, an average delay that is an average transmission delay value of video frames transmitted from the transmitting terminal to the receiving terminal, a jitter that is a deviation width of video frame transmission delay values, a skip ratio that is a ratio of skipped video frames not transmitted from the transmitting terminal to the receiving terminal, and a freezing indicating that a screen is frozen on the receiving terminal. FIG. 4 is a table showing equations of calculating parameters used to calculate a video quality index according to at least one example embodiment.

Figure 5:
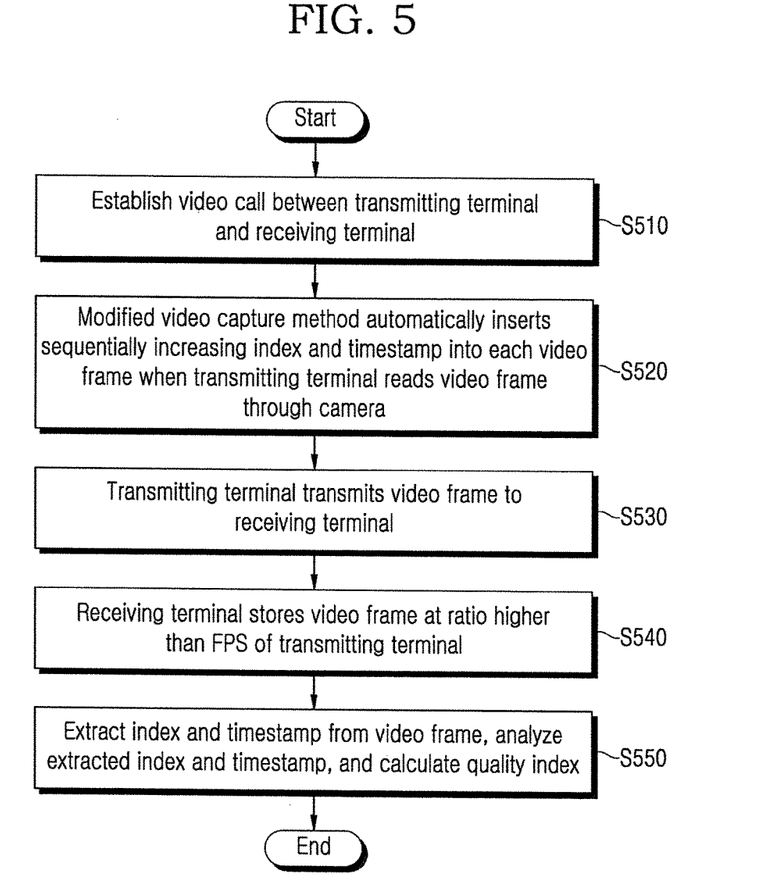
FIG. 5 is a flowchart illustrating a method of measuring a video call quality of a mobile terminal according to one embodiment.

FIG. 5 is a flowchart illustrating an example of a method of measuring a video call quality of a mobile terminal according to one embodiment. Hereinafter, the video call quality measurement method will be described with reference to FIG. 5. In operation S510, a video call is established between the transmitting terminal 30 and the receiving terminal 40.

Here, prior to performing operation S510, the video call quality measurement method may further include initiating a video call measurement in a terminal agent installed in each of the transmitting terminal and the receiving terminal, and performing time synchronization between the transmitting terminal and the receiving terminal.

In operation S520, when the video call app 203 of the transmitting terminal 30 calls the original video capture function 140, the modified video capture function inserts a sequentially increasing index and timestamp into each video frame acquired through the camera 250.

In operation S530, the transmitting terminal 30 transmits the video frame to the receiving terminal 40.

Here, the video call quality measurement method may further include reading, by the receiving terminal 40, the video frame buffer at a ratio higher than the FPS of the transmitting terminal 30 and storing the read video frame buffer as a received video frame, and reading, by the OCR text recognizer 207 of the receiving terminal 40, a timestamp value and an index value in each video frame and generating a list of index values and a list of timestamp values.

In operation S540, the receiving terminal stores the video frame at a ratio higher than the FPS of the transmitting terminal. For example, the receiving terminal may read the video frame at a ratio higher than the FPS of the transmitting terminal. When a modified frame ratio of the receiving terminal is higher than an FPS of the transmitting terminal, it is possible to verify, for example, catch a modified frame on the receiving terminal. Also, a change trend between frames may be accurately measured when increasing the modified frame ratio. If the modified frame ratio increases, it may enhance the accuracy of quality index data.

In operation S550, the index and the timestamp may be extracted from the stored video frame and the quality index may be calculated through an OCR text recognition by the OCR text recognizer 207.

Here, in operation S550, the quality index may be calculated based on at least one of a number of transmission frames that is a number of video frames transmitted from the transmitting terminal 30 to the receiving terminal 40, an initial delay that is a time used to transmit an initial video frame from the transmitting terminal to the receiving terminal, an average delay that is an average transmission delay value of video frames transmitted from the transmitting terminal to the receiving terminal, a jitter that is a deviation width of video frame transmission delay values, a skip ratio that is a ratio of skipped video frames not transmitted from the transmitting terminal to the receiving terminal, and a freezing indicating that a screen is frozen on the receiving terminal.

According to example embodiments, a method and system for measuring a video call quality of a mobile terminal may measure actual video call quality between two mobile terminals each in which a video call app is installed.

Also, according to example embodiments, without comparing a reference video source and a video call, it is possible to read a specific index and timestamp inserted into a transmitted video frame through an OCR text recognition and to calculate a quality index of the video frame based on such information.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A video call quality measurement system for measuring a video call quality between mobile terminals, comprising:
   a terminal agent provided in a mobile terminal, wherein the terminal agent is configured to:
      insert, using at least one processor of the mobile terminal when the mobile terminal operates as a transmitting terminal, a sequentially increasing index and timestamp into a video frame every time video capture function is called, the video capture function being provided from a terminal operating system (OS) of the mobile terminal and used to acquire the video frame through a camera in response to a video call connection;
      read, using the at least one processor when the mobile terminal operates as a receiving terminal, the video frame at a ratio higher than a frame per second (FPS) of the transmitting terminal; and
      calculate, using the at least one processor, a quality index of the video frame based on the index value and the timestamp value recognized in the video frame.

2. The video call quality measurement system of claim 1, wherein the terminal agent is further configured to:
   synchronize using the at least one processor, a time through a network time protocol (NTP) server for time synchronization between the transmitting terminal and the receiving terminal.

3. The video call quality measurement system of claim 1, wherein the quality index is calculated based on at least one of a number of transmission frames that is a number of video frames transmitted from the transmitting terminal to the receiving terminal, an initial delay that is a time used to transmit an initial video frame from the transmitting terminal to the receiving terminal, an average delay that is an average transmission delay value of video frames transmitted from the transmitting terminal to the receiving terminal, a jitter that is a deviation width of video frame transmission delay values, a skip ratio that is a ratio of skipped video frames not transmitted from the transmitting terminal to the receiving terminal, and a freezing indicating that a screen is frozen on the receiving terminal.

4. A video call quality measurement method for measuring a video call quality between a transmitting terminal and a receiving terminal, the method comprising:
   establishing a video call with the receiving terminal by the transmitting terminal;
   inserting, by the transmitting terminal, a sequentially increasing index and timestamp into a video frame every time a video capture function is called, the video capture function being provided from a terminal operating system (OS) and used to acquire the video frame through a camera in response to a video call connection; and
   transmitting, by the transmitting terminal, the video frame into which the index and the timestamp are inserted to the receiving terminal at a preset frame per second (FPS),
   wherein the receiving terminal reads the video frame at a ratio higher than the FPS and calculates a quality index of the video frame based on an index value and a timestamp value recognized in the video frame.

5. The method of claim 4, further comprising:
   synchronizing a time through a network time protocol (NTP) server for time synchronization with the receiving terminal.

6. The method of claim 4, wherein the quality index is calculated based on at least one of a number of transmission frames that is a number of video frames transmitted from the transmitting terminal to the receiving terminal, an initial delay that is a time used to transmit an initial video frame from the transmitting terminal to the receiving terminal, an average delay that is an average transmission delay value of video frames transmitted from the transmitting terminal to the receiving terminal, a jitter that is a deviation width of video frame transmission delay values, a skip ratio that is a ratio of skipped video frames not transmitted from the transmitting terminal to the receiving terminal, and a freezing indicating that a screen is frozen on the receiving terminal.

7. A video call quality measurement method for measuring a video call quality between a transmitting terminal and a receiving terminal, the method comprising:
   establishing a video call with the transmitting terminal by the receiving terminal;
   receiving, by the receiving terminal, a video frame in which a sequentially increasing index and timestamp are inserted from the transmitting terminal at a preset frame per second (FPS);
   reading, by the receiving terminal, the video frame at a ratio higher than the FPS;
   recognizing, by the receiving terminal, the index and the timestamp in the video frame; and
   calculating, by the receiving terminal, a quality index of the video frame based on values of the recognized index and timestamp,
   wherein every time a video capture function is called, the sequentially increasing index and the timestamp are inserted into the video frame, the video capture function being provided from a terminal operating system (OS) and used to acquire the video frame through a camera in response to a video call connection in the transmitting terminal.

8. The method of claim 7, further comprising:
synchronizing a time through a network time protocol (NTP) server for time synchronization with the transmitting terminal.

9. The method of claim 7, wherein the calculating comprises calculating the quality index based on at least one of a number of transmission frames that is a number of video frames transmitted from the transmitting terminal to the receiving terminal, an initial delay that is a time used to transmit an initial video frame from the transmitting terminal to the receiving terminal, an average delay that is an average transmission delay value of video frames transmitted from the transmitting terminal to the receiving terminal, a jitter that is a deviation width of video frame transmission delay values, a skip ratio that is a ratio of skipped video frames not transmitted from the transmitting terminal to the receiving terminal, and a freezing indicating that a screen is frozen on the receiving terminal.

* * * * *